(12) United States Patent
Birkbeck et al.

(10) Patent No.: US 9,071,742 B2
(45) Date of Patent: Jun. 30, 2015

(54) OPTICAL IMAGING WITH FOVEATION

(75) Inventors: Aaron L. Birkbeck, Bonita, CA (US);
Anis Husain, San Diego, CA (US);
Eliseo Ranalli, Irvine, CA (US)

(73) Assignee: ZIVA CORPORATION, San Diego, CA (US)

( * ) Notice: Subject to any disclaimer, the term of this patent is extended or adjusted under 35 U.S.C. 154(b) by 519 days.

(21) Appl. No.: 13/543,411

(22) Filed: Jul. 6, 2012

(65) Prior Publication Data

US 2013/0016178 A1    Jan. 17, 2013

Related U.S. Application Data

(60) Provisional application No. 61/508,663, filed on Jul. 17, 2011, provisional application No. 61/524,738, filed on Aug. 17, 2011.

(51) Int. Cl.
| | |
|---|---|
| *H04N 7/00* | (2011.01) |
| *H04N 5/225* | (2006.01) |
| *G02B 26/12* | (2006.01) |
| *G02B 13/06* | (2006.01) |
| *G02B 26/08* | (2006.01) |

(52) U.S. Cl.
CPC .............. *H04N 5/2254* (2013.01); *G02B 13/06* (2013.01); *G02B 26/127* (2013.01); *G02B 26/0833* (2013.01); *H04N 5/2258* (2013.01); *H04N 5/2259* (2013.01)

(58) Field of Classification Search
CPC ........... H04N 5/23296; H04N 5/23238; G02B 13/06; G02B 15/00
USPC .......................................................... 348/38
See application file for complete search history.

(56) References Cited

U.S. PATENT DOCUMENTS

| 4,025,154 A | 5/1977 | Yuta | |
|---|---|---|---|
| 6,358,280 B1 * | 3/2002 | Herrick | ........................ 623/6.26 |
| 6,421,185 B1 * | 7/2002 | Wick et al. | ..................... 359/637 |

(Continued)

FOREIGN PATENT DOCUMENTS

WO    WO 9721188 A1 *  6/1997

OTHER PUBLICATIONS

Wick et al. "Advances in adaptive imaging" (Oct. 2011) SPIE Digital Library. SPIE Newsroom.*

(Continued)

*Primary Examiner* — Sath V Perungavoor
*Assistant Examiner* — Matthew J Anderson
(74) *Attorney, Agent, or Firm* — Anatoly S. Weiser

(57) ABSTRACT

Selected described embodiments include an imager providing concurrent wide field of view (WFOV) and foveated images. The imager includes a frontend optic configured to receive light from a scene. Corrective optics reduces distortions, and transmits the light to a beam splitter. One portion of the light exiting the beam splitter is focused on a WFOV image detector. A second portion of the light falls on a scanning mirror that can be configured to target a selected field position in the field of view. From the scanning mirror, the light passes through a magnifier and is corrected by an adaptive wavefront corrector. The corrector may be configured to correct aberrations corresponding to the particular field of view selected by the scanning mirror. The light from the wavefront corrector is focused on a foveated image detector. The images captured by the image detectors may be stored, processed, and transmitted to other systems.

23 Claims, 5 Drawing Sheets

(56) References Cited

U.S. PATENT DOCUMENTS

| | | | |
|---|---|---|---|
| 6,473,241 B1* | 10/2002 | Wick et al. | 359/637 |
| 6,829,391 B2* | 12/2004 | Comaniciu et al. | 382/243 |
| 6,977,777 B1* | 12/2005 | Wick | 359/677 |
| 7,084,904 B2* | 8/2006 | Liu et al. | 348/218.1 |
| 7,542,090 B1* | 6/2009 | Merchant | 348/362 |
| 7,973,834 B2* | 7/2011 | Yang | 348/240.3 |
| 8,094,169 B2* | 1/2012 | Shimizu | 345/647 |
| 8,956,396 B1* | 2/2015 | Friend et al. | 607/89 |
| 2007/0252954 A1 | 11/2007 | McGuire et al. | |
| 2007/0253057 A1 | 11/2007 | Potsaid et al. | |
| 2009/0080695 A1 | 3/2009 | Yang | |
| 2010/0002071 A1* | 1/2010 | Ahiska | 348/36 |
| 2011/0134552 A1 | 6/2011 | Kner et al. | |
| 2011/0216156 A1* | 9/2011 | Bigioi et al. | 348/36 |
| 2012/0105310 A1 | 5/2012 | Sverdrup et al. | |

OTHER PUBLICATIONS

Bolduc et al. "A Real-time Foveated Sensor with Overlapping Receptive Fields" (1997) Real-time Imaging 3, 195-212.*

Martinez et al. "Foveated, wide field of view imaging system using a liquid crystal spatial light modulator" (May 2001) Optics Express 555, vol. 8, No. 10.*

Curatu, George. "Analysis and Design of Wide Angle Foveated Optical Systems". (May 2009) PHD Thesis. Univ. of Central Florida.*

Wick et al. "Foveated imaging demonstration". (Jan. 2002) Optics Express, vol. 10, No. 1.*

Hua et al. "Dual-sensor foveated imaging system" (Jan. 2008) Applied Optics, vol. 47, No. 3.*

Zhao et al. "Broadband and wide field of view foveated imaging system in space" (Oct. 2008) Optical Engineering vol. 47, No. 10.*

Vorontsov, M.A. "Adaptive wavefront correction with self-organized control system architecture". (Jul. 1998) Army Research Lab. SPIE vol. 3432.*

Bagwell et al. "Active Zoom Imaging for Operationally Responsive Space". (2007) MEMS Adaptive Optics. SPIE vol. 6467.*

Ata et al., Optical Manipulation of Objects in Microfluidic Devices, Mat. Res. Soc. Symp. Proc., 2002, U1.6.1-U1.6.7, vol. 729, all pages.

Birkbeck et al., Laser tweezer controlled solid immersion lens for high resolution imaging in microfluidic and biological samples, Proc. SPIE, 2004, 76-84, vol. 5275, all pages.

Birkbeck et al., Laser-tweezer-controlled solid immersion microscopy in microfluidic systems, Opt. Lett., 2005, 2712-2714, vol. 30, No. 20, all pages.

Birkbeck et al., Self-aligned micro-optical spatial filtering in a microfluidic system, Appl. Opt., 2006, 6429-6434, vol. 45, Iss. 25, all pages.

Birkbeck et al., Two Dimensional Electrophoretic Microlens Alignment, Proc. SPIE, 2001, 251-255, vol. 4455, Session 8, all pages.

Brun et al., Modeling and calibration of coupled fish-eye CCD camera and laser range scanner for outdoor environment reconstruction, 3DIM '07, Sixth International Conference on, 2007, 320-327, all pages.

Datte et al., Status of the digital pixel array detector for protein crystallography, Nuclear Instruments & Methods in Physics Research, Section A (Accelerators, Spectrometers, Detectors and Associated Equipment), 1999, 576-590, vol. 421, Iss. 3, all pages.

Diamond et al., Optically Written Conical Lenses for Resonant Structures and Detector Arrays, Spatial Light Modulators and Integrated Optoelectronic Arrays, 1999, PD2 (3 pages), all pages.

Duparre et al., Thin compound-eye camera, App. Opt., 2005, 2949-2956, vol. 44, No. 15, all pages.

Duparre et al., Artificial compound eye zoom camera, Bioinsp. Biomim., 2008, pp. 046008-1-046008-6, vol. 3, No. 4, all pages.

Firoozfam et al., Multi-camera conical imaging; calibration and robust 3-D motion estimation for ROV-based mapping and positioning, OCEANS '02 MTS/IEEE, 2002, 1595-1602, vol. 3, all pages.

Firoozfam et al., A Multi-Camera Conical Imaging System for Robust 3D Motion Estimation, Positioning and Mapping from UAVs, 2003, Advanced Video and Signal Based Surveillance, 2003, Proceedings, IEEE Conference on, 99-106, all pages.

Gurtner et al., Investigation of Fish-Eye Lenses for Small-UAV Aerial Photography, IEEE T. Geoscience and Remote Sensing 2009, 709-721, vol. 47, No. 3, all pages.

Herbert, Calibration of fisheye lenses by inversion of area projections, App. Opt., 1986, 1875-1876, vol. 25, No. 12, all pages.

Hua et al., Dual-sensor foveated imaging system, App. Opt., 2008, 317-327, vol. 47, No. 3, all pages.

Husain (Ed.), Wide Area Surveillance, OIDA, 2006, all (58) pages.

Lohmann, Scaling laws for lens systems, App. Opt., 1989, 4996-4998, vol. 28, No. 23, all pages.

Peleg et al., Stereo panorama with a single camera, Computer Vision and Pattern Recognition, 1999, IEEE Computer Society Conference on, 1999, 395-401 vol. 1., all pages.

Scotti et al., Dual camera intelligent sensor for high definition 360 degrees surveillance, IEEE Proceedings-Vision, Image and Signal Processing, 2005, 250-257, vol. 152, No. 2, all pages.

Spencer et al., Optical design of a panoramic, wide spectral band, infrared fisheye lens, Proc. SPIE, 2006, 63421P-1-63421P-63421P-11, vol. 6342, all pages.

Sturzl et al., Rugged, obstruction-free, mirror-lens combination for panoramic imaging, App. Opt., 2008, 6070-6078, vol. 47, No. 32, all pages.

Ying et al., Fisheye lenses calibration using straight-line spherical perspective projection constraint, Computer Vision—ACCV 2006, 61-70, LNCS vol. 3852, all pages.

* cited by examiner

OPTICAL IMAGING WITH FOVEATION

CROSS-REFERENCE TO RELATED APPLICATIONS

The present application claims priority from (1) U.S. Provisional Patent Application Ser. No. 61/508,663, entitled APPARATUS, METHODS, AND ARTICLES OF MANUFACTURE FOR FOVEATED VISION (FOVIS), filed on 17 Jul. 2011; and (2) U.S. Provisional Patent Application Ser. No. 61/524,738, entitled Apparatus, Methods, and Articles of Manufacture for Foveated Vision (FOVIS), filed 17 Aug. 2011. Each of these patent documents is hereby incorporated by reference in its entirety as if fully set forth herein, including text, figures, claims, tables, and computer program listing appendices (if present), and all other matter in the patent documents.

This invention was made with government support under contract number SB093-008 awarded by Defense Advanced Research Projects Agency (DARPA). The government has certain rights in the invention.

FIELD OF THE INVENTION

This document is related to the field of imaging.

BACKGROUND

Fovea is a small area of the retina that affords acute central vision. The verb "foveate" means to direct an eye so that the fovea is directed at an object within the field of view. In this document, "foveation" and related inflectional morphemes of "fovea" generally refer to an imager's ability to provide zooming into an area of a scene, without losing the overall contextual information afforded by the larger view of the scene. Foveation is useful in many applications. For example, increasing demands on the warfighter for situational awareness may benefit from optical imaging techniques that enable gathering of information over large fields of view, and simultaneous rapid zooming into selected areas of the field of view.

Interest in foveated imaging has increased because of emerging military applications that include imaging for missiles, overhead surveillance based on unmanned aerial vehicles (UAVs), land-based surveillance for unattended sensors/motes and robotics, as well as laser pointing and designating. In addition, panoramic (e.g., 360°) threat detection systems, artificial vision systems, collision avoidance imaging systems, horizon tracking-capable system, border fence security systems, and submarine periscopes may benefit from inclusion or addition of foveation features.

Known foveated systems generally use gimbals (moving lens groups mechanically) and/or incorporate multiple cameras. Such systems may be expensive in terms of economic cost, power, weight, and size. They may also suffer from situational awareness issues. For example, they may not be able to provide the whole scene and the foveated image at the same time, or provide real-time multiple target tracking.

It is therefore desirable to provide wide field of view single- and multi-spectral imaging and vision methods and systems with foveation. It is desirable to provide such systems with lower costs, lower size, lower weight, and/or lower power consumption.

SUMMARY

To address one or more of the needs described above and/or other needs, selected embodiments described in this document include catadioptric and other optical systems that incorporate a wide-angle lens and adaptive optical elements enabling wide field of view (WFOV) imaging with optical foveation and concurrent zoom capability having localized correction of aberrations.

In embodiments, an imaging systems includes (1) a frontend optic configured to receive light from a scene in a wide field of view (WFOV), (2) a beam splitter configured to receive light exiting from the frontend optic and divide the light exiting from the frontend optic into a first beam and a second beam, (3) a wide field of view (WFOV) image detector configured to receive the first beam, (4) a scanning component controllable by one or more scan position signals, an adaptive wavefront corrector controllable by one or more wavefront correction signals, (5) an optical magnifier, and (5) a foveated image detector. The scanning component is configured to receive all or part of the second beam and reflect a portion of the second beam towards the adaptive wavefront corrector. The portion of the second beam incident on the adaptive wavefront corrector corresponds to a part (less than all) of the WFOV received by the frontend optic. The portion of the second beam reflected towards the adaptive wavefront corrector is determined by position of the scanning component, and the position of the scanning component is determined by the one or more scan position signals. The adaptive wavefront corrector is configured to correct the portion of the second beam reflected by the scanning component based on the one or more wavefront correction signals to obtain a corrected portion of the second beam, and to reflect the corrected portion of the second beam towards the foveated image detector. The optical magnifier is interposed in a light path between the scanning component and the foveated image detector. The imaging system operates so that WFOV images of the scene are formed on the WFOV image detector, and foveated images of selected portions of the scene are formed on the foveated image detector.

In embodiments, an imaging method includes the following steps: (1) receiving, through a frontend optic, light from a scene in a wide field of view (WFOV); (2) dividing light that exits the frontend optic into at least two beams, the at least two beams, including a first beam and a second beam; (3) projecting the first beam onto a wide field of view (WFOV) image detector; (4) selecting a portion of the second beam with a scanning component controllable by one or more scan position signals; (5) correcting the selected portion of the second beam by configuring an adaptive wavefront corrector controllable by one or more wavefront correction signals; (6) magnifying the selected portion of the second beam; and (7) projecting the selected, corrected, and amplified portion of the second beam onto a foveated image detector.

These and other features and aspects of selected embodiments not inconsistent with the present invention(s) will be better understood with reference to the following description, drawings, and appended claims.

DETAILED DESCRIPTION

Figure 1:
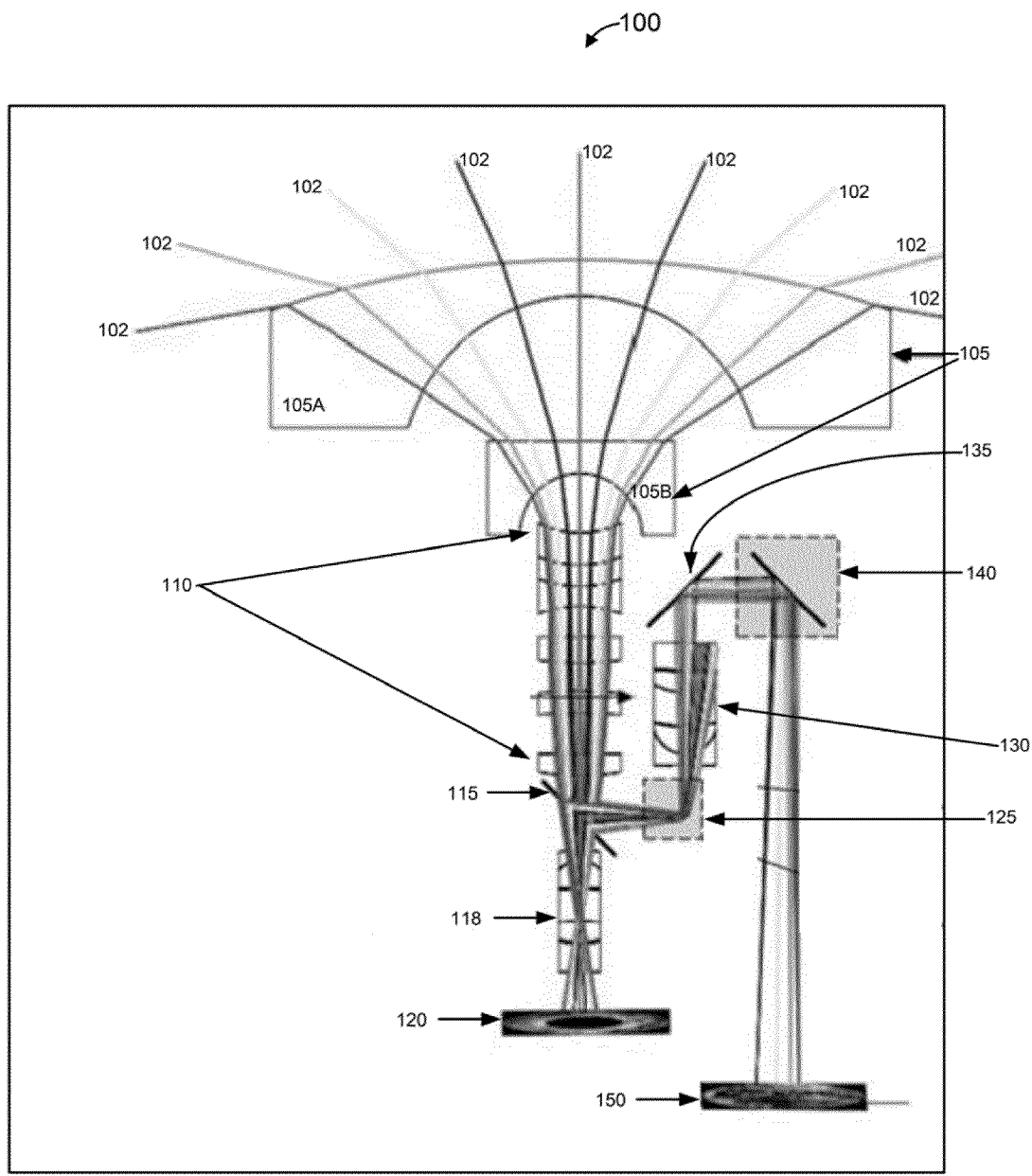
FIG. 1 shows selected components of an optical imaging system configured in accordance with selected aspects described in this document.

In this document, the words "embodiment," "variant," "example," and similar words and expressions refer to a particular apparatus, process, or article of manufacture, and not necessarily to the same apparatus, process, or article of manufacture. Thus, "one embodiment" (or a similar expression) used in one place or context may refer to a particular apparatus, process, or article of manufacture; the same or a similar expression in a different place or context may refer to a different apparatus, process, or article of manufacture. The expression "alternative embodiment" and similar words and expressions are used to indicate one of a number of different possible embodiments, variants, or examples. The number of possible embodiments, variants, or examples is not necessarily limited to two or any other quantity. Characterization of an item as "exemplary" means that the item is used as an example. Such characterization does not necessarily mean that the embodiment, variant, or example is preferred; the embodiment, variant, or example may but need not be a currently preferred embodiment, variant, or example. All embodiments, variants, and examples are described for illustration purposes and are not necessarily strictly limiting.

The words "couple," "connect," and similar expressions with their inflectional morphemes do not necessarily import an immediate or direct connection, but include within their meaning both direct/immediate connections and connections through mediate elements.

The expression "processing logic" should be understood as selected steps and decision blocks and/or hardware for implementing the selected steps and decision blocks. "Decision block" means a step in which a decision is made based on some condition, and process flow may be altered based on whether the condition is met or not met.

A "field position" is the specific direction of incidence of the rays received by optics (e.g., a frontend optic) from a scene. Generally, a field position may vary in two dimensions. Thus, a scan of a scene involves image captures over field positions that may together cover the scene. The concept of field position is well understood in the imaging art.

"Optical" means related to visible and/or infrared portion(s) of the electromagnetic spectrum.

The adjective "wide," as it relates to the field of view, is intended in a sense relative to foveated view. A wide field of view is wider than a foveated view. In other words, the solid angle of the wide field of view is greater than the solid angle of the foveated view. A wide field of view may be, but not necessarily is, a panoramic field of view, such as a 360° by 20° field of view. A panoramic view may also be less than a 360° horizontal view, for example, greater than 45° or greater than 180°. It should be noted, however, that the embodiments described below may also operate with a wide field of view of less than 45°. A foveated view is a view of a portion of the wide field of view. In the examples below, the solid angle of the foveated view may be no greater than ½, ¼, 0.1, or 0.01 of the solid angle of the wide field of view. The foveated view may be narrower than the wide field of view in one or both dimensions. For a 360° by 20° wide field of view, a foveated view may be, for example, a 3° by 2° field of view, or a 3° by 20° field of view.

When "top," "bottom," "left," "right" and analogous directional indicators are used for describing the embodiments in the Figures, they are intended to facilitate the description and not as substantive requirements. Thus, the "top" of the Boule lens in some of the Figures indicates the top when the Figures are held in an upright position, and are used to direct the reader to the specific portions of the Figures.

Other and further explicit and implicit definitions and clarifications of definitions may be found throughout this document.

Reference will be made in detail to one or more embodiments (apparatus, methods, and/or articles of manufacture) that are illustrated in the accompanying drawings. Same reference numerals may be used in the drawings and this description to refer to the same apparatus elements and method steps. The drawings may be in a simplified form, not to scale, and may omit apparatus elements and method steps that can be added to the described systems and methods, while possibly including optional elements and/or steps.

FIG. 1 shows selected components of an optical system 100 configured in accordance with selected aspects described in this document. The optical system 100 includes a frontend optic 105 that receives light rays 102 from a scene in the field of view and directs the light rays 102 through a corrective optics block 110 to a beam splitter 115. The beam splitter 115 divides and directs the light into two different paths.

In the first path, the light goes through a wide field of view (WFOV) optical block 118 that focuses the light onto a focal plane in which WFOV image detector 120 lies. The wide field of view image can thus be captured by the WFOV image detector 120, and then, for example, read, stored, processed, transmitted, and or displayed.

In the second path, the light is incident on a tip-tilt mirror 125. The angle of the tip-tilt mirror 125 is controllable, for example, by one or more electrical signals, through a servomechanism based on piezoelectric, voice-coil, mesohydraulic, and other technologies; the angle may be controlled in two dimensions, to allow two-dimensional scanning of the field of view. A portion of the reflected light (which portion depends on the position of the tip-tilt mirror 125) is reflected into an optical magnifier 130, that magnifies the light. The magnified light then falls on a folding mirror 135, which redirects the light towards an adaptive wavefront corrector 140. From the adaptive wavefront corrector 140, the light is reflected onto a foveated image detector 150. The image formed on the foveated image detector 150 (the "foveated image") can thus be captured by the foveated image detector 150, and then, for example, read, stored, processed, transmitted, and or displayed.

Figure 2A:
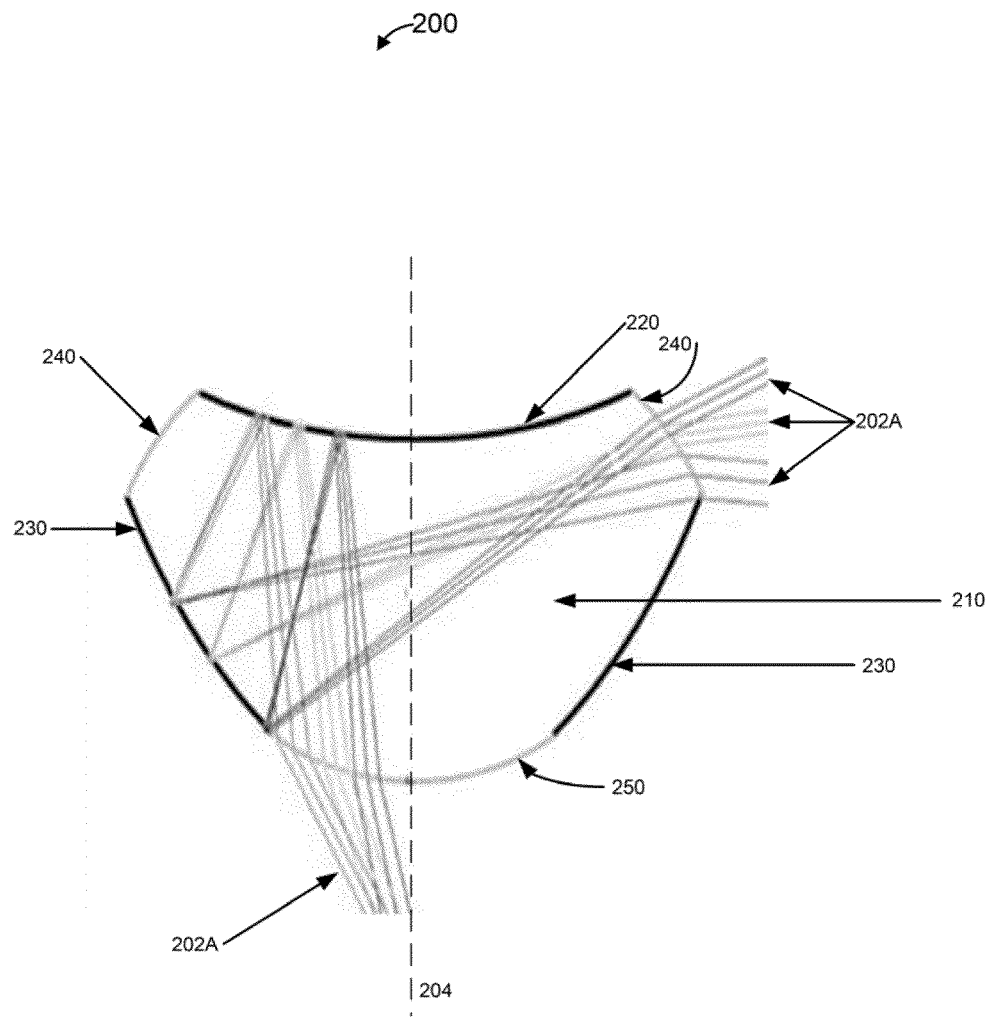
FIGS. 2A and 2B illustrate selected aspects of a catadioptric "Boule" lens.
Figure 2B:
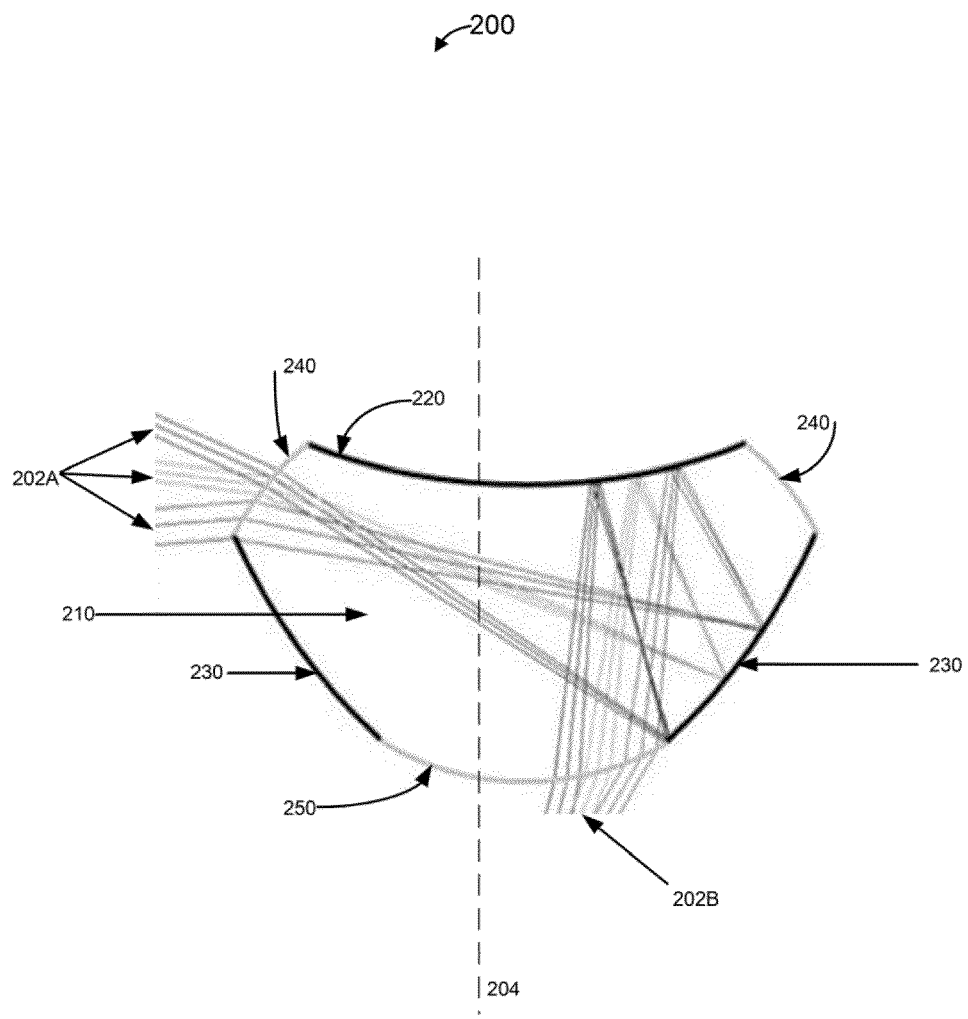

The frontend optic 105 may be a wide field of view lens, for example, a fisheye lens, as shown in FIG. 1. In embodiment, the frontend optic 105 is implemented as a novel catadioptric "Boule" lens. FIGS. 2A and 2B illustrate a cross-section of a Boule lens 200. A body 210 of the Boule lens 200 is made of a material with a high (>1) index of refraction, and has a shape defined by rotation of the cross-section around a center axis 204. A concave surface 220 is reflective (as viewed from the inside of the lens 200); for example, it is covered with a reflective material. Similarly, circular side surface 230 also is reflective (as viewed from the inside of the lens 200). As shown in FIGS. 2A and 2B, light rays 202A may enter the Boule lens 200 through a lens surface 240 (which is circular), are reflected from the side surface 230 onto the surface 220, reflect from the surface 220, and exit through a surface 250 at the bottom of the lens 200. The Boule lens may be fabricated by diamond machining a high index plastic material to achieve the correct surface curvatures, polishing the component pieces to a specified surface roughness within the design tolerances, depositing metals for the reflective layers and anti-reflective coating on both sides of the refractive elements, and aligning and bonding of the four components together to form the completed Boule lens. The Boule lens may be intrinsically color corrected for all visible and/or infrared wavelengths.

A parabolic mirror and other optical components may also be used for the frontend optic 105.

The light rays exiting the frontend optic 105 enter the corrective optics block 110, which may contain one or more elements. The corrective optics block 110 is interposed in the light path between the frontend optic 105 and the light splitting element 115, and may be configured to correct aberrations/distortions caused by the frontend optic 105. If the frontend optic 105 can provide diffraction limited resolution, the corrective optic 110 may not be necessary; indeed, it may be omitted in certain other variants as well.

From the corrective optic block 110, the light rays fall onto or enter the beam splitter 115, where the light is split into two parts that follow different light paths. (In embodiments, the light may be split into three or more parts with their corresponding paths, for example, to provide progressive foveation.) We can refer to the first path as a WFOV path, and to the second one as a foveated path. The beam splitter may be, for example, a semi-transparent mirror that transmits a part of the light incident upon it along the foveated path, and reflects the rest along the WFOV path, or vice versa. As shown in FIG. 1, the beam splitter transmits a portion of the incident light along the WFOV path, towards the WFOV optical block 118, and reflects a portion of the incident light towards the tip-tilt mirror 125. The ratio of the light between the two path may be for example, 1:1, 60:40, 10:1, 20:1, or 100:1, with uneven ratios favoring the foveated path to reduce the relative loss of contrast along the foveated path.

In embodiments where it is present, the WFOV optical block 118 may perform various functions. Generally, it projects the wide field of view well onto the WFOV image detector 120, which can capture the WFOV images.

Turning now to the second or foveated path, the light reflected from the beam splitter 115 falls onto the tip-tilt (or scanning) mirror 125 and is reflected once again, towards the optical magnifier 130. The light received by the optical magnifier 130 corresponds to a part of the wide field of view; the particular part of the field of view depends on the angle (position) of the tip-tilt mirror 125. The angle can generally be controlled in two dimensions, to allow two-dimensional scanning of the field of view (but in variants, one-dimensional control may be used).

The optical magnifier 130 magnifies the portion of the field of view that it receives, for example, so that the portion is eventually projected to substantially all or a large part of the foveated image detector 150. From the optical magnifier 130, the light is projected onto the folding mirror 135, which redirects it towards the adaptive wavefront corrector 140.

Note that the various mirrors create what we can refer to as a "folded optical design" or "folded optics" for the foveated path, meaning that at least two reflective components (mirrors) change the physical path of the light within the optical system, to obtain a longer focal length than would otherwise be possible in the same physical size. In selected folded optical designs, the BFL is longer than each physical dimension of the design; in selected optical designs, the reflective elements change the light path by a combined angle of over 90 degrees, over 135 degrees, and/or 180 degrees or more. The folded optical design may be a feature of various embodiments, but is not necessarily required.

The wavefront corrector 140 is configured to compensate for aberrations in the light wavefront due to focusing errors from extreme (large incident angle) rays that limit optimal image resolution; it may also correct for other aberrations resulting, for example, from the frontend optic 105 and other optical components of the system 100. The wavefront corrector 140 may be, for example, a single- or multi-parameter controllable deformable mirror. Commercially available examples of MEMS-based (microelectromechanical system-based) general purpose deformable mirrors may be available from Thorlabs, 435 Route 206, North Newton, N.J. 07860; tel. 973-579-7227; www.thorlabs.com; www.thorlabs.com/NewGroupPage9.cfm?ObjectGroup_ID=3258. Such mirrors are generally intended to take out aberrations such as defocus, astigmatism, spherical aberration and coma, often requiring many control parameters. The wavefront corrector 140 may also be a liquid crystal spatial light modulator, or another kind of adaptive optics. The wavefront corrector 140 is configured using one or more inputs, for local compensation, i.e., compensation specific to the field position of the foveated view selected by the tip-tilt mirror 125. For example, to achieve an aberration compensated 10× foveated zoom operation, a correction surface may be tailored to both the distribution and magnitude of the phase-front error and may be specific to the location of the target in the field of view. The settings of the adaptive wavefront corrector 140 may be determined in advance for each position of the tip-tilt mirror 125 (by characterizing the frontend optic, for example), so that the image is appropriately corrected for each individual position of the tip-tilt mirror 125. The settings may then be stored in a look-up table, to be retrieved based on the position of the tip-tilt mirror.

Figure 3:
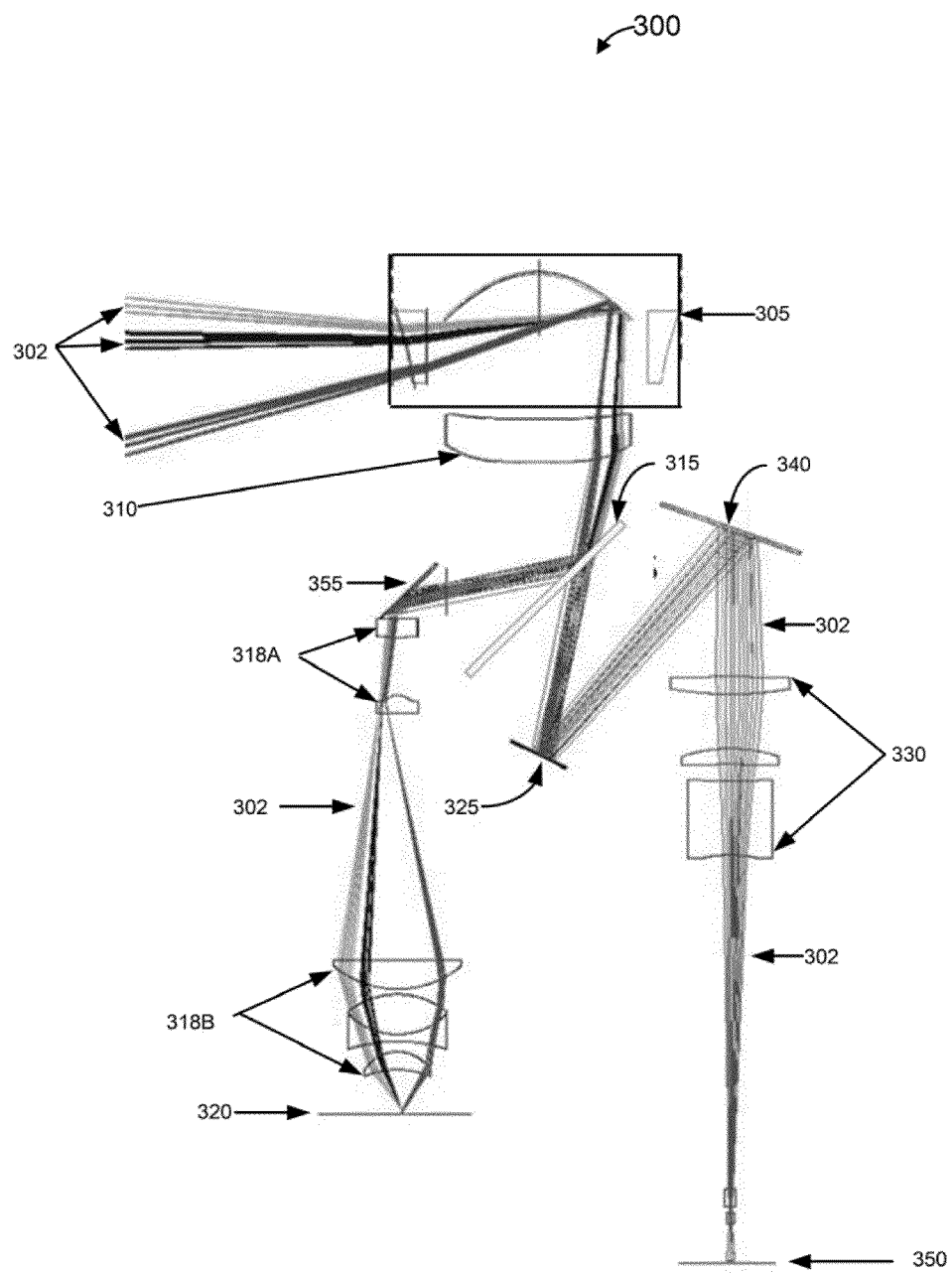
FIG. 3 shows selected components of another optical imaging system configured in accordance with selected aspects described in this document.

FIG. 3 shows selected components of another optical system 300 configured in accordance with selected aspects described in this document. The system 300 is similar to the system 100 discussed above, and its components are designated (for the most part) with reference numerals beginning with the digit "3" and ending with the same two digits as their respective counterparts in the system 100. Here, however, the WFOV path includes a folding mirror, and no such mirror may appear in the foveated path. Additionally, the optical magnifier is interposed between an adaptive wavefront corrector and a foveated image detector. Note also that the light in the foveated path is transmitted through the beam splitter 315 (which may be a partially reflective mirror), and the light in the WFOV path is reflected from the beam splitter 315; the arrangement in the system 100 was reversed in this regard.

Briefly, the optical system 300 includes a frontend optic 305 that receives light rays 302 from a scene in the field of view, and directs the light rays 302 through a corrective optics block 310 to a beam splitter 315. The beam splitter 315 divides and directs the light into two different light paths. In the first path, the light goes through WFOV optical blocks 318A and 318B, which focuses the light onto a focal plane of a WFOV image detector 320. The wide field of view image can thus be captured by the WFOV image detector 320, and then, for example, read, stored, processed, transmitted, and or displayed. In the second path, the light is incident on a tip-tilt (or scanning) mirror 325, which can be identical or similar to the tip-tilt mirror 125 of the system 100. The light reflected from the tip-tilt mirror 325 is reflected into an adaptive wavefront corrector 340. From the adaptive wavefront corrector 340, the light travels through an optical magnifier 330, where the light is magnified and focused on a foveated image detector 350. The foveated image formed on the foveated image detector 350 can be captured by the foveated image detector 350, and then, for example, read, stored, processed, transmitted, and or displayed.

Figure 4:
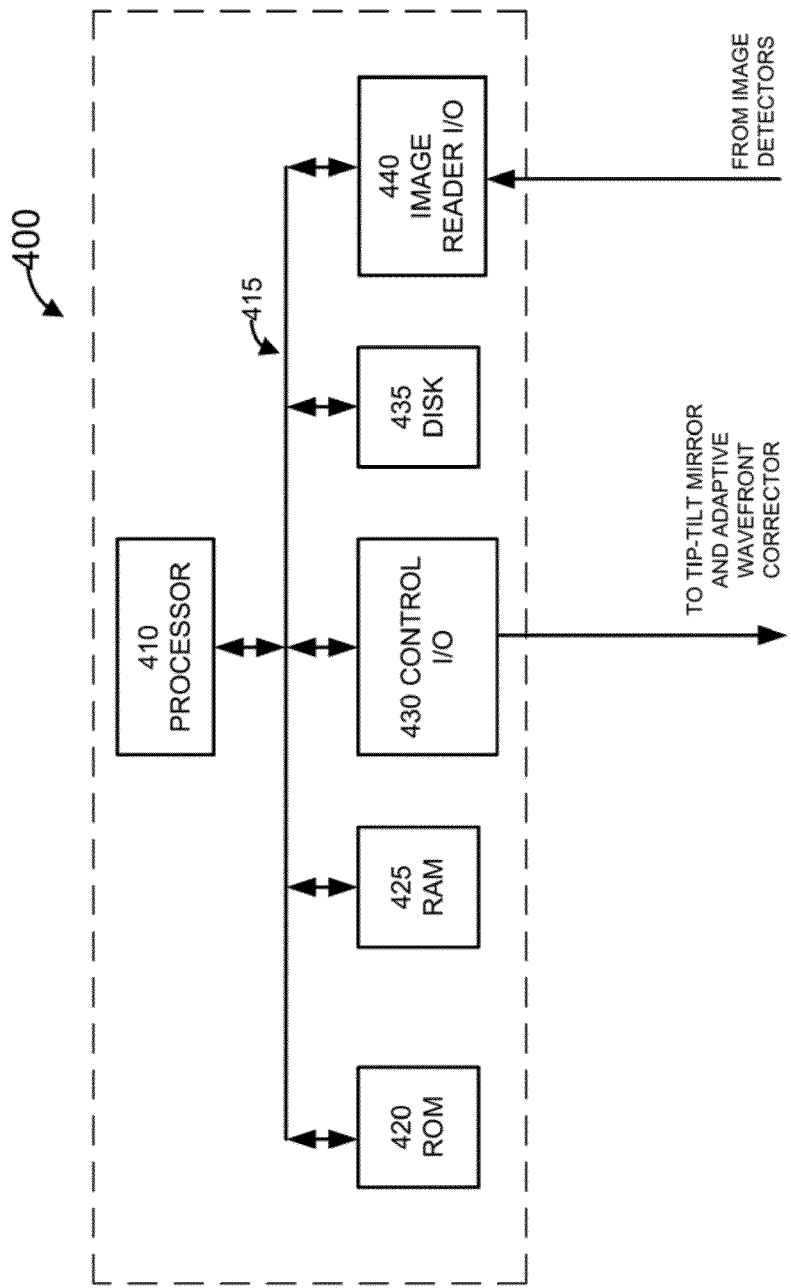
FIG. 4 illustrates selected components of a processor system that can be used to control the optical imaging systems configured in accordance with selected aspects described in this document.

FIG. 4 shows selected components of a processor system 400 that may be coupled to optical systems such as the systems 100 and 300 described above. The processor system 400 may be configured (1) to control the scanning by the tip-tilt mirrors (e.g., the tip-tilt mirrors 125 and 325), (2) to provide control inputs to the adaptive wavefront correctors (e.g., the wavefront correctors 140 and 340), and (3) to read/process/store/transmit the images captured by the image detectors (e.g., the WFOV image detectors 120/320 and the foveated image detectors 150/350).

In FIG. 4, a processor 410 executes computer-readable program code instructions to control the operation of the processor system 400 and perform the method steps described throughout this document. The instructions may be stored in the processor 410 itself, in a read only memory (ROM) 420, in a random access memory (RAM) 425, and/or in disk storage 435. Generally, the program code instructions may be embodied in machine-readable storage media, such as hard drives, floppy diskettes, CD-ROMs, DVDs, flash memory and similar volatile or non-volatile devices that can store the instructions permanently or temporarily, in a non-transitory manner. The program code can also be transmitted over a transmission medium, for example, over electrical wiring or cabling, through optical fiber, wirelessly, or by any other form of physical transmission. The transmission can take place over a dedicated link between telecommunication devices, or through a wide- or local-area network, such as the Internet, an intranet, extranet, or any other kind of public or private network. In one embodiment, the program code is downloaded to the processor system 400 through a network interface of the processor system 400 (not shown).

The adaptive wavefront corrector look-up table may also be stored in one or more of the memory components of the processor system 400.

The processor system 400 also includes a control I/O circuit 430, which may be controlled by the processor 410 when the processor 410 executes the program code. The control I/O circuit 430 may be or may include analog and/or digital components, and may have one or more electrical outputs. The control I/O circuit 430 connects to corresponding control inputs of the scanning mirror and the adaptive wavefront corrector of the optical system, to set the states of the scanning mirror and the adaptive wavefront corrector. For example, the state of the output of the control I/O circuit 430 determines the field position or direction of the scanning mirror of the optical system, and the state of the control signals/parameter of a deformable mirror. The processor system 400 additionally includes an image reader I/O 440, which may be a digital interface circuit configured to allow the processor 410 to read the images captured by the WFOV and foveated image detectors of the optical system.

A bus 415 connects together the different components of the computer system 400.

In embodiments, a foveated vision system is connected to a remote user through a network. The foveated vision system continuously or continually transmits to the remote user the WFOV image, and in response to a trigger event transmits the foveated view (either in addition or instead of the WFOV image). The trigger event may be a cue derived from automated analysis of the WFOV image, the remote user's request, or another event. In this way, the consumption of power and/or bandwidth resources may be reduced. Such remote vision systems may be used, for example, in video conferencing and remote security monitoring applications.

In embodiments, the WFOV images and the foveated images are captured at different wavelength. For example, the WFOV images may be captured in the visible spectrum, while the foveated images may be captured in the infrared spectrum, or vice versa.

The optical systems with foveation described in this document may be incorporated in panoramic threat detection systems, artificial vision systems, collision avoidance imaging systems, horizon tracking-capable system, border fence security systems, and submarine periscopes. They can also be used to enhance Intelligence, Surveillance, and Reconnaissance (ISR) capabilities for unmanned aerial vehicles (UAVs); unmanned ground vehicles (UGVs); unattended ground sensors (UGSs); soldier-portable platforms; and remote security camera systems. Furthermore, the optical systems can be integrated with control systems (human interface or artificial vision systems) for target recognition and tracking. They can operate at both visible and infrared wavelengths. Rapid foveated target selection may be made possible using an eye tracking interface that translates movements of the eye and head into target acquisition cues.

The system and process features described throughout this document may be present individually, or in any combination or permutation, except where presence or absence of specific feature(s)/element(s)/limitation(s) is inherently required, explicitly indicated, or otherwise made clear from the context.

Although the process steps and decisions (if decision blocks are present) may be described serially in this document, certain steps and/or decisions may be performed by separate elements in conjunction or in parallel, asynchronously or synchronously, in a pipelined manner, or otherwise. There is no particular requirement that the steps and decisions be performed in the same order in which this description lists them or the Figures show them, except where a specific order is inherently required, explicitly indicated, or is otherwise made clear from the context. Furthermore, not every illustrated step and decision block may be required in every embodiment in accordance with the concepts described in this document, while some steps and decision blocks that have not been specifically illustrated may be desirable or necessary in some embodiments in accordance with the concepts. It should be noted, however, that specific embodiments/variants/examples use the particular order(s) in which the steps and decisions (if applicable) are shown and/or described.

The instructions (machine executable code) corresponding to the method steps of the embodiments, variants, and examples disclosed in this document may be embodied directly in hardware, in software, in firmware, or in combinations thereof. A software module may be stored in volatile memory, flash memory, Read Only Memory (ROM), Electrically Programmable ROM (EPROM), Electrically Erasable Programmable ROM (EEPROM), hard disk, a CD-ROM, a DVD-ROM, or other form of non-transitory storage medium known in the art, whether volatile or non-volatile. Exemplary storage medium or media may be coupled to one or more processors so that the one or more processors can read information from, and write information to, the storage medium or media. In an alternative, the storage medium or media may be integral to one or more processors.

This document describes in detail the inventive apparatus, methods, and articles of manufacture for foveated imaging. This was done for illustration purposes only and, therefore, the foregoing description is not necessarily intended to limit the spirit and scope of the invention(s) described. Neither the specific embodiments of the invention(s) as a whole, nor those of its or their features necessarily limit the general principles underlying the invention(s). The specific features described herein may be used in some embodiments, but not in others, without departure from the spirit and scope of the invention(s) as set forth herein. Various physical arrangements of components and various step sequences also fall within the intended scope of the invention(s). Many additional modifications are intended in the foregoing disclosure, and it will be appreciated by those of ordinary skill in the pertinent art that in some instances some features will be employed in the absence of a corresponding use of other features. The embodiments described above are illustrative and not necessarily limiting, although they or their selected features may be limiting for some claims. The illustrative examples therefore do not necessarily define the metes and bounds of the invention(s) and the legal protection afforded the invention(s).

What is claimed is:

1. An imaging systems, comprising:
   a frontend optic configured to receive light from a scene in a wide field of view (WFOV);
   a beam splitter configured to receive light exiting from the frontend optic and divide the light exiting from the frontend optic into at least two beams, the at least two beams comprising a first beam and a second beam;
   a wide field of view (WFOV) image detector configured to receive the first beam;
   a scanning component controllable by one or more scan position signals;
   an adaptive wavefront corrector controllable by one or more wavefront correction signals;
   an optical magnifier; and
   a foveated image detector;
   wherein:
   the scanning component is configured to receive all or part of the second beam and reflect a portion of the second beam towards the adaptive wavefront corrector, the portion of the second beam reflected towards the adaptive wavefront corrector corresponds to a part of the WFOV received by the frontend optic, the portion of the second beam reflected towards the adaptive wavefront corrector is determined by position of the scanning component, the position of the scanning component is determined by the one or more scan position signals;
   the adaptive wavefront corrector is configured (1) to correct the portion of the second beam reflected by the scanning component based on the one or more wavefront correction signals to obtain a corrected portion of the second beam, and (2) to reflect the corrected portion of the second beam towards the foveated image detector; and
   the optical magnifier is interposed in light path between the scanning component and the foveated image detector;
   so that a WFOV images of the scene are formed on the WFOV image detector and foveated images of selected portions of the scene are formed on the foveated image detector.

2. An imaging system according to claim 1, further comprising a corrective optics block interposed in light path between the frontend optic and the beam splitter.

3. An imaging system according to claim 2, wherein the scanning component comprises a tip-tilt mirror.

4. An imaging system according to claim 3, further comprising a wide field of view optical block interposed in light path between the beam splitter and the WFOV image detector, the wide field of view optical block being configured to focus the first beam on the WFOV image detector.

5. An imaging system according to claim 3, wherein the adaptive wavefront corrector comprises a deformable mirror.

6. An imaging system according to claim 3, wherein the adaptive wavefront corrector comprises a liquid crystal spatial light modulator.

7. An imaging system according to claim 3, further comprising a folding mirror interposed between the scanning component and the foveated image detector, so that the second beam passes through folded optics.

8. An imaging system according to claim 3, wherein the frontend optic comprises a catadioptric lens.

9. An imaging system according to claim 3, wherein the frontend optic comprises a Boule lens.

10. An imaging system according to claim 3, wherein the frontend optic comprises a fisheye lens.

11. An imaging system according to claim 3, wherein the frontend optic is a panoramic optic and the WFOV images formed on the WFOV image detector are panoramic images.

12. An imaging system according to claim 3, wherein the frontend optic is a panoramic optic and the WFOV images formed on the WFOV image detector are 360 degree images.

13. An imaging system according to claim 3, wherein solid angle ratio of the foveated images to the WFOV images is less than one.

14. An imaging system according to claim 3, wherein solid angle ratio of the foveated images to the WFOV images is no greater than 0.5.

15. An imaging system according to claim 3, wherein solid angle ratio of the foveated images to the WFOV images is no greater than 0.1.

16. An imaging system according to claim 3, wherein the beam splitter is configured so that more light energy goes into the second beam than into the first beam.

17. An imaging system according to claim 3, wherein the beam splitter comprises a partially reflective mirror, the first beam passes through the partially reflective mirror, and the second beam is reflected by the partially reflective mirror.

18. An imaging system according to claim 3, wherein the beam splitter comprises a partially reflective mirror, the second beam passes through the partially reflective mirror, and the first beam is reflected by the partially reflective mirror.

19. An imaging system according to claim 3, further comprising a processor system configured (1) to provide the one or more scan position signals and the one or more wavefront correction signals so that the foveated images are corrected based on positions of the scanning component. (2) read the WFOV images captured by the WFOV image detector, and (3) read the foveated images captured by the foveated image detector.

20. An imaging system according to claim 19, wherein the processor system stores a table relating the positions of the scanning component to settings of the adaptive wavefront corrector.

21. An imaging method, comprising:
   receiving through a frontend optic light from a scene in a wide field of view (WFOV);
   dividing light that exits from frontend optic into at least two beams, the at least two beams comprising a first beam and a second beam;
   projecting the first beam onto a wide field of view (WFOV) image detector;
   selecting a portion of the second beam with a scanning component controllable by one or more scan position signals;
   correcting the second beam by configuring an adaptive wavefront corrector controllable by one or more wavefront correction signals;
   magnifying the second beam; and
   projecting the second beam onto a foveated image detector.

22. An imaging method according to claim 21, further comprising:
   capturing wide field of view images formed on the WFOV image detector; and
   capturing foveated images formed on the foveated image detector.

23. An imaging method according to claim 22, further comprising:
   determining the one or more scan position signals;
   determining the one or more wavefront correction signals;
   providing the one or more scan position signals to the scanning component; and
   providing the one or more wavefront correction signals to the adaptive wavefront corrector;
   wherein the foveated image is corrected based on position of the scanning component.

* * * * *

UNITED STATES PATENT AND TRADEMARK OFFICE
CERTIFICATE OF CORRECTION

| | | |
|---|---|---|
| PATENT NO. | : 9,071,742 B2 | Page 1 of 1 |
| APPLICATION NO. | : 13/543411 | |
| DATED | : June 30, 2015 | |
| INVENTOR(S) | : Aaron L. Birckbeck et al. | |

It is certified that error appears in the above-identified patent and that said Letters Patent is hereby corrected as shown below:

In the Claims

Column 10, line 44, cancel "component. (2)" and replace the cancelled text with --component, (2)--;

Column 10, line 55, cancel "from frontend optic" and replace the cancelled text with --from the frontend optic--.

Signed and Sealed this
Seventeenth Day of November, 2015

Michelle K. Lee
*Director of the United States Patent and Trademark Office*